United States Patent [19]

Shamshoum et al.

[11] Patent Number: 5,504,048

[45] Date of Patent: Apr. 2, 1996

[54] ADDITION OF LITHIUM COMPOUNDS TO ZIEGLER-NATTA CATALYSTS FOR INCREASED MOLECULAR WEIGHT IN POLYOLEFINS

[75] Inventors: Edwar S. Shamshoum, Houston; Christopher Bauch, Seabrook, both of Tex.

[73] Assignee: Fina Technology, Inc., Dallas, Tex.

[21] Appl. No.: 71,438

[22] Filed: Jun. 2, 1993

[51] Int. Cl.⁶ .............................. B01J 31/00; C08F 4/64
[52] U.S. Cl. ................. 502/117; 502/102; 502/113; 502/118; 502/158; 502/170; 502/171; 526/123.1
[58] Field of Search ............................... 502/113, 117, 502/118, 158, 170, 171, 102

[56] References Cited

U.S. PATENT DOCUMENTS

| | | | |
|---|---|---|---|
| 4,231,948 | 11/1980 | Pez | 502/117 |
| 4,562,173 | 12/1985 | Terano et al. | 502/127 |
| 5,096,867 | 3/1992 | Canich | 502/117 |
| 5,120,867 | 6/1992 | Welborn, Jr. | 502/117 |

*Primary Examiner*—E. Rollins Cross
*Assistant Examiner*—E. D. Irzinski
*Attorney, Agent, or Firm*—Jim D. Wheelington; M. Norwood Cheairs

[57] ABSTRACT

This invention relates to a conventional supported heterogeneous Ziegler-Natta catalyst for the polymerization of olefins. It has been found that adding a lithium compound to a transition metal catalyst component and then adding an organoaluminum co-catalyst and an organosilicon electron donor produces a catalyst which yields polymer with increased molecular weight. The lithium compound is of the general formula LiCp wherein Cp is a cyclopentadienyl or substituted cyclopentadienyl and is preferably lithium cyclopentadienide or lithium indene. Preferably, the molar ratio of lithium compound/transition metal is at least 0.2.

28 Claims, 1 Drawing Sheet

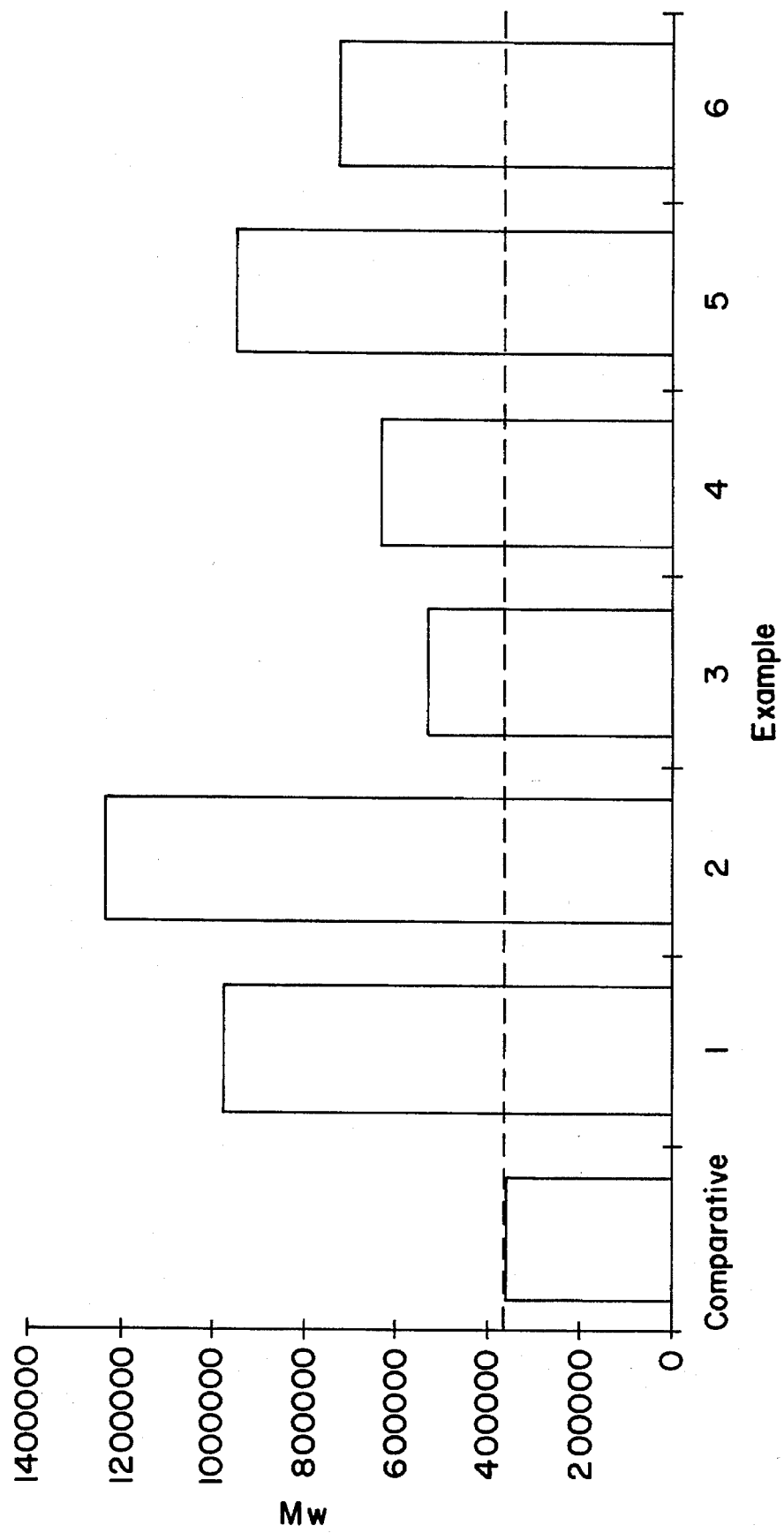

ADDITION OF LITHIUM COMPOUNDS TO ZIEGLER-NATTA CATALYSTS FOR INCREASED MOLECULAR WEIGHT IN POLYOLEFINS

BACKGROUND OF THE INVENTION

1. Field of the Invention

This invention relates to catalyst system for the polymerization of olefins, particularly, to a catalyst system comprising a conventional supported Ziegler-Natta catalyst and a lithium cyclopentadienide or lithium indene compound used to polymerize α-olefins, such as propylene.

2. Description of the Prior Art

Polyolefin manufacturing processes typically involve the polymerization of olefin monomer with an organometallic catalyst of the Ziegler-Natta type. Catalyst systems for the polymerization of olefins are well known in the art. Typically, these systems include a Ziegler-Natta type polymerization catalyst component; a co-catalyst, usually an organoaluminum compound; and an external electron donor compound or selectivity control agent, usually an organosilicon compound. Examples of such catalyst systems are shown in the following U.S. Pat. Nos.: 4,107,413; 4,294,721; 4,439,540; 4,115,319; 4,220,554; 4,460,701; and 4,562,173; the disclosures of these patents are hereby incorporated by reference.

A Ziegler-Natta type polymerization catalyst is basically a complex derived from a halide of a transition metal, for example, titanium, chromium or vanadium with a metal hydride and/or a metal alkyl, typically an organoaluminum compound, as a co-catalyst. The catalyst is usually comprised of a titanium halide supported on a magnesium compound complexed with an alkylaluminum co-catalyst.

Lithium cyclopentadienide and lithium indene compounds are known in the synthesis of metallocene compounds useful as catalysts. U.S. Pat. No. 5,168,111; 5,096,867; 5,057,475 and 5,055,438 disclosed using a cyclopentadienyl lithium compound in a synthesis of a bridged metallocene-alumoxane catalyst system for the production of polyolefins and ethylene-α-olefin copolymers. U.S. Pat. No. 5,120,867 disclosed use of lithium indene in the synthesis of a silicon-bridged metallocene.

Lithium compounds have been used in hydrogenation of conjugated diolefin polymers. U.S. Pat. No. 4,673,714 disclosed the use of hydrocarbon lithium compounds, specifically alkyl lithium, with bis(cyclopentadienyl)titanium compound to hydrogenate the unsaturated double bonds of conjugated diolefins and an improved process which eliminated the need for these alkyl lithium compounds.

Molecular weight can be increased in polymerization processes using conventional supported Ziegler-Natta catalysts in several known ways.

It would be advantageous to increase molecular weight in polymerization processes using conventional supported Ziegler-Natta catalyst by the addition of a compound which interacts or modifies the catalyst without changing process condition or other catalyst components.

SUMMARY OF THE INVENTION

Accordingly, this invention provides a catalyst system to enhance molecular weight of polyolefins.

And, this invention provides a catalyst system in which increasing a component increases the molecular weight.

Also, this invention provides a polymerization process using a catalyst system to enhance the molecular weight of polyolefins.

Furthermore, this invention provides a process for making a catalyst for use in the polymerization of olefins to enhance molecular weight.

These and other objects are accomplished by a catalyst for polymerization of olefins comprising:

a) a conventional supported Ziegler-Natta catalyst component containing titanium;

b) a lithium compound of the formula LiCp wherein Cp is a cyclopentadienyl or substituted cyclopentadienyl;

c) an aluminum trialkyl co-catalyst described by the formula $AlR'_3$ where R' is an alkyl of from 1–8 carbon atoms and R' may be the same or different; and d) an external electron donor either simultaneously with or after step (b), said external electron donor having the general formula $SiR_m(OR')_{4-m}$ where R is selected from the group consisting of an alkyl group, a cycloalkyl group, an aryl group and a vinyl group; R' is an alkyl group; and m is 0–3, wherein when R is an alkyl group, R may be identical with R'; when m is 0, 1 or 2, the R' groups may be identical or different; and when m is 1, 2 or 3, the R groups may be identical or different.

Preferably, the molar ratio of LiCp/transition metal is at least 0.2.

BRIEF DESCRIPTION OF THE DRAWINGS

A more complete appreciation of the invention and many of the attendant advantages thereof will be readily understood by reference to the following detailed description when considered in connection with the accompanying drawings:

FIG. 1 is a graph of the effect of lithium cyclopentadienide and lithium indene on molecular weight.

DETAILED DESCRIPTION OF THE INVENTION

The present invention relates to the combination of a particular group of compounds with a particular type of catalyst for use in the polymerization of polyolefins. This combination results in a catalyst system that produces a polyolefin with increased molecular weight as illustrated by the comparative examples included below. The catalyst system also provides control of the xylene solubles of the polymer product. These and other beneficial advantages will become more apparent from the following detailed description of the invention and the accompanying examples.

Any of the conventional supported Ziegler-Natta transition metal compound catalyst components can be used in the present invention. The transition metal compound is preferably of the general formula $MR''_x$ where M is the metal, R'' is a halogen or a hydrocarboxyl and x is the valence of the metal. Preferably, M is a Group IVB, VB or VIB metal, more preferably a Group IVB, and most preferably titanium. Preferably, R is chlorine, bromine, an alkoxy or a phenoxy, more preferably chlorine or ethoxy and most preferably, chlorine. Illustrative examples of the transition metal compounds are $TiCl_4$, $TiBr_4$, $Ti(OC_2H_5)_3Cl$, $Ti(OC_2H_5)_3Cl$, $Ti(OC_3H_7)_2Cl_2$, $TiOC_6H_{13})_2Cl_2$, $Ti(OC_2H_5)_2Br_2$ and $Ti(OC_{12}H_{25})Cl_3$. Mixtures of the transition metal compounds may be used. No restriction on the number of transition metal compounds is made as long as at least one transition metal compound is present.

The support should be an inert solid which is chemically unreactive with any of the components of the conventional Ziegler-Natta Catalyst. The support is preferably a magnesium compound. Examples of the magnesium compounds which are to be used to provide a support source for the catalyst component are magnesium halides, dialkoxymagnesiums, alkoxymagnesium halides, magnesium oxyhalides, dialkylmagnesiums, magnesium oxide, magnesium hydroxide, and carboxylates of magnesium.

One particular Ziegler-Natta catalyst which can be used in the present invention is a new generation, Ziegler-type titanium catalyst for the polymerization of olefins as disclosed in U.S. Pat. Nos. 4,927,797; 4,816,433 and 4,839,321, the disclosures of which are hereby incorporated.

The aluminum alkyl is of the general formula $AlR'_3$ and R' is an alkyl of from 1-8 carbon atoms and R' may be the same or different. Examples of aluminum alkyls are trimethyl aluminum (TMA), triethyl aluminum (TEAl) and triisobutyl aluminum (TiBAl). The preferred aluminum alkyl is TEAl.

The term "electron donor" as used herein, refers to the external electron donor or selectivity control agent. The external electron donor acts as a stereoregulator to control the amount of atactic form of polymer produced. It may also increase the production of isotactic polymers. The electron donor for the present invention is any one of the stereoselectivity control agents which are effective with Ziegler-Natta catalysts. Typically, an electron donor is an organosilicon compound. Examples of electron donors are cyclohexylmethyldimethyoxysilane (CMDS), diphenyldimethoxysilane (DPMS) and isobutyl trimethoxysilane (IBMS). Other examples of electron donors are disclosed in U.S. Pat. Nos. 4,218,339; 4,395,360; 4,328,122; 4,473,660; 4,562,173 and 4,547,552, which are hereby incorporated by reference.

The electron donors included in the present invention are organic silicon compounds such as those described by the following formula:

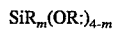
$SiR_m(OR:)_{4-m}$ where R is an alkyl group, a cycloalkyl group, an aryl group or a vinyl group, R" is an alkyl group, m is 0–4, R may be the same or different, R" may be the same or different.

The lithium compound of the present invention is of the formula LiCp wherein Cp is a cyclopentadienyl or substituted cyclopentadienyl. Preferably, the lithium compound is lithium cyclopentadienide or lithium indene. Preferably, the molar ratio of lithium compound/transition metal is at least 0.2.

Without limiting the scope of the claims, the mechanism of the effect of adding lithium cyclopentadienyl-type compounds, such as lithium indenyl, to heterogeneous supported titanium-based Ziegler-Natta catalysts which results in producing polymer with increased molecular weight is believed to be that indenyl substitutes for available chloride in $TiCl_4$ causing a reduction in the number of active titanium centers. This is especially true at indenyl/titanium ratios between 0.167 and 1.5.

It is believed that the displacement of chloride by indenyl on the titanium results in the remaining active polymerization sites being those which produce polymer of higher molecular weight. As the relative amount of indenyl is increased, those sites having a tendency to produce lower molecular weight polymers are made inactive and the molecular weight of the polymer increases. It is further believed that the theoretical mechanism for indenyl would be operative for other cyclopentadienyl-type (cyclopentadienyl and substituted cyclopentadienyl) radicals.

The present invention also provides a process for the polymerization of olefins using the catalyst system described above comprising:

a) selecting a conventional Ziegler-Natta catalyst component;

b) contacting the catalyst with a lithium compound of the formula LiCp wherein Cp is cyclopentadienyl or a substituted cyclopentadienyl;

c) contacting an electron donor containing silicon with an organoaluminum co-catalyst compound;

d) adding the catalyst-lithium compound mixture to the electron donor/co-catalyst mixture to form a catalyst system;

e) introducing the catalyst system into a polymerization reaction zone containing a monomer; and f) extracting polymer product from the reactor.

A Ziegler-Natta catalyst may be pre-polymerized to improve the performance of the catalyst. Generally, a pre-polymerization process is effected by contacting a small amount of monomer with the catalyst after the catalyst, i.e., the transition metal catalyst component and co-catalyst, has been contacted with the electron donor. A pre-polymerization process is described in U.S. Pat. Nos. 4,767,735, 4,927,797 and 5,122,583, hereby incorporated by reference.

The present invention also provides a process for making a catalyst for polymerization of olefins comprising:

a) selecting a conventional supported Ziegler-Natta catalyst component;

b) adding a lithium compound of the formula LiCp wherein Cp is a cyclopentadienyl or substituted cyclopentadienyl c) adding an aluminum trialkyl co-catalyst described by the formula $AlR'_3$ where R' is an alkyl of from 1–8 carbon atoms and R' may be the same or different; and d) adding an external electron donor either simultaneously with or after step (b), said external electron donor having the general formula $SiR_m(OR')_{4-m}$ where R is selected from the group consisting of an alkyl group, a cycloalkyl group, an aryl group and a vinyl group; R' is an alkyl group; and m is 0–3, wherein when R is an alkyl group, R may be identical with R'; when m is 0, 1 or 2, the R' groups may be identical or different; and when m is 1, 2 or 3, the R groups may be identical or different.

The invention having been generally described, the following examples are given as particular embodiments of the invention and to demonstrate the practice and advantages thereof. It is understood that the examples are given by way of illustration and are not intended to limit the specification or the claims to follow in any manner.

EXAMPLE 1

Combination of additive with catalyst

A slurry of 50 mg solid catalyst component and 1.2 mg lithium indene (LiInd) was prepared in 5.0 ml mineral oil.

Polymerization

To a 2.0 liter autoclave, in which the air had been sufficiently replaced by nitrogen, was added 1 ml of the mineral oil slurry, 1 mmole triethylaluminum and 0.1 mmole cyclohexyl-methyldimethoxysilane. The autoclave was then charged with 1.4 liters of liquid propylene and 16 mmoles of gaseous hydrogen. The mixture was then heated to 70° C. and maintained for 60 minutes. The polymer was then dried at 80° C. Polymerization results are shown in Table 1.

EXAMPLES 2–4

Mixing of catalyst with the lithium compound and polymerizations were carried out similarly as in Example 1. The ratios of lithium compound to catalyst and polymerization results are shown in Table 1.

EXAMPLE 5

Catalyst was prepared by stirring 0.5 g of the solid catalyst component with 7 mg LiInd in 10 ml of heptane for 1 hour and drying under vacuum at room temperature. Polymerization was carried out similarly as in Example 1.

EXAMPLE 6

Catalyst was prepared and polymerization carried out in the same manner as Example 5 except that 2.0 mg of lithium cyclopentadienide (LiCp) was used instead of LiInd.

COMPARATIVE EXAMPLE

The polymerization of propylene was carried out as in Example 1 except that nothing was added to the solid catalyst component slurry in mineral oil.

TABLE I

| Example | 1 | 2 | 3 | 4 | 5 | 6 | Comparative |
|---|---|---|---|---|---|---|---|
| Additive | LiInd | LiInd | LiInd | LiCp | LiInd | LiCp | None |
| Additive/Ti ratio | 1.0 | 2.0 | 0.5 | 1.0 | 0.2 | 0.2 | — |
| Polymer Yield (g) | 140 | 112 | 248 | 184 | 144 | 138 | 291 |
| g polymer/g catalyst | 14,000 | 11,200 | 24,800 | 18,400 | 14,400 | 13,800 | 29,100 |
| % Xylene Solubles | 2.00 | 2.08 | 1.68 | 1.84 | 2.08 | 1.76 | 1.80 |
| $M_w$ | 977790 | 1235122 | 531338 | 633874 | 950166 | 723965 | 361745 |
| $M_n$ | 147366 | 170504 | 71628 | 88481 | 119532 | 103088 | 50921 |

The addition of lithium salts of indene and cyclopentadienide to a conventional supported Ziegler-Natta catalyst has been shown to modify the performance and hydrogen response of the catalyst in polymerization of olefins. By increasing the lithium compound-to-transition metal molar ratios, the molecular weight of the polymer is increased. The more dramatic increases in molecular weights at identical ligand (indenyl or cyclopentadienyl) to titanium ratios was observed for the bulkier ligand, as illustrated in FIG. 1.

Table I shows the effect of the addition of LiCp and LiInd on a conventional supported Ziegler-Natta catalyst. At molar ratios above 0.2 the effect on molecular weight appears to be positive. Changing other variables in the synthesis of the catalyst system or in the polymerization process, e.g., the molar ratio of the co-catalyst to the electron donor or the addition of hydrogen to the polymerization reactor, will also affect the molecular weight of the polymer product. However, if the other process variables remain constant, adding a cyclopentadienyl-lithium or substituted cyclopentadienyl-lithium compound to a conventional supported Ziegler-Natta catalyst will result in a polyolefin product having increased molecular weight. The effect is especially significant when the molar ratio of LiCp/Ti is at least 0.2.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letter of Patent of the U.S. of America is:

1. A catalyst for polymerization of olefins comprising:
   a) a conventional supported Ziegler-Natta catalyst component comprising a transition metal compound of the general formula $MR''_x$ where M is the metal, R" is a halogen or a hydrocarboxyl and x is the valence of the metal;
   b) a lithium compound of the formula LiCp wherein Cp is cyclopentadienyl or indene;
   c) an aluminum trialkyl co-catalyst described by the formula $AlR'_3$ where R' is an alkyl of from 1–8 carbon atoms and R' may be the same or different; and
   d) an external electron donor, said external electron donor having the general formula $SiR_m(OR')_{4-m}$ where R is selected from the group consisting of an alkyl group, a cycloalkyl group, an aryl group and a vinyl group; R' is an alkyl group; and m is 0–3, wherein when R is an alkyl group, R may be identical with R'; when m is 0, 1 or 2, the R' groups may be identical or different; and when m is 1, 2 or 3, the R groups may be identical or different.

2. A catalyst as in claim 1 wherein the molar ratio of lithium compound/transition metal is at least 0.2.

3. A catalyst as in claim 1 wherein M is a Group IVB, VB or VIB metal.

4. A catalyst as in claim 1 wherein M is a Group IVB metal.

5. A catalyst as in claim 4 wherein M is titanium.

6. A catalyst as in claim 1 wherein R is chlorine, bromine, an alkoxy or a phenoxy.

7. A catalyst as in claim 6 wherein R" is chlorine or ethoxy.

8. A catalyst as in claim 7 wherein R" is chlorine.

9. A catalyst as in claim 1 wherein the transition metal compound is $TiCl_4$, $TiBR_4$, $Ti(OC_2H_5)_3Cl$, $Ti(OC_2H_5)_3Cl$, $Ti(OC_3H_7)_2Cl_2$, $TiOC_6H_{13})_2Cl_2$, $Ti(OC_2H_5)_2Br_2$ and $Ti(OC_{12}H_{25})Cl_3$.

10. A catalyst as in claim 1 wherein the aluminum trialkyl co-catalyst is trimethyl aluminum, triethyl aluminum or triisobutyl aluminum.

11. A catalyst as in claim 1 wherein the aluminum co-catalyst is trimethyl aluminum.

12. A catalyst as in claim 1 wherein the electron donor is cyclohexylmethyldimethyoxysilane, diphenyldimethoxysilane or isobutyltrimethoxysilane.

13. A catalyst as in claim 12 wherein the electron donor is cyclohexylmethyldimethyoxysilane.

14. A catalyst as in claim 1 wherein the lithium compound is lithium indene.

15. A process for making a catalyst for polymerization of olefins comprising:
   a) selecting a conventional supported Ziegler-Natta catalyst component comprising a transition metal compound of the formula $MR''_x$ where M is the metal, R" is a halogen or a hydrocarboxyl and x is the valence of the metal;
   b) adding a lithium compound wherein the lithium compound is lithium cyclopentadienide or lithium indene;
   c) adding an aluminum trialkyl co-catalyst described by the formula $AlR'_3$ where R' is an alkyl of from 1–8 carbon atoms and R' may be the same or different; and
   d) adding an external electron donor either simultaneously with or after step (b), said external electron donor having the general formula $SiR_m(OR')_{4-m}$ where R is selected from the group consisting of an alkyl group, a cycloalkyl group, an aryl group and a vinyl group; R' is an alkyl group; and m is 0–3, wherein when R is an alkyl group, R may be identical with R'; when m is 0, 1 or 2, the R' groups may be identical or different; and when m is 1, 2 or 3, the R groups may be identical or different.

16. A process as in claim 15 wherein the molar ratio of lithium compound/transition metal is at least 0.2.

17. A process as in claim 15 wherein M is a Group IVB, VB or VIB metal.

18. A process as in claim 15 wherein M is a Group IVB metal.

19. A process as in claim 18 wherein M is titanium.

20. A process as in claim 15 wherein R" is chlorine, bromine, an alkoxy or a phenoxy.

21. A process as in claim 20 wherein R" is chlorine or ethoxy.

22. A process as in claim 21 wherein R" is chlorine.

23. A process as in claim 15 wherein the transition metal compound is $TiCl_4$, $TiBr_4$, $Ti(OC_2H_5)_3Cl$, $Ti(OC_2H_5)_3Cl$, $Ti(OC_3H_7)_2Cl_2$, $TiOC_6H_{13})_2Cl_2$, $Ti(OC_2H_5)_2Br_2$ and $Ti(OC_{12}H_{25})Cl_3$.

24. A process as in claim 15 wherein the aluminum trialkyl co-catalyst is treimethyl aluminum, triethyl aluminum or triisobutyl aluminum.

25. A process as in claim 15 wherein the aluminum co-catalyst is trimethyl aluminum.

26. A process as in claim 15 wherein the electron donor is cyclohexylmethyldimethyoxysilane, diphenyldimethoxysilane or isobutyltrimethoxysilane.

27. A process as in claim 26 wherein the electron donor is cyclohexylmethyldimethyoxysilane.

28. A catalyst as in claim 15 wherein the lithium compound is lithium indene.

* * * * *